United States Patent [19]

Nakasugi et al.

[11] Patent Number: 5,096,309
[45] Date of Patent: Mar. 17, 1992

[54] HYDRODYNAMIC BEARING SYSTEM

[75] Inventors: Mikio Nakasugi, Chofu; Shoichi Shimura, Yokohama, both of Japan

[73] Assignee: Canon Kabushiki Kaishi, Tokyo, Japan

[21] Appl. No.: 735,172

[22] Filed: Jul. 23, 1991

Related U.S. Application Data

[63] Continuation of Ser. No. 652,320, Feb. 8, 1991, abandoned, which is a continuation of Ser. No. 502,634, Apr. 20, 1990, abandoned.

[30] Foreign Application Priority Data

| Apr. 3, 1989 | [JP] | Japan | 1-081551 |
| May 11, 1989 | [JP] | Japan | 1-116196 |
| Jul. 4, 1989 | [JP] | Japan | 1-171154 |

[51] Int. Cl.[5] ............................................. F16C 17/10
[52] U.S. Cl. ............................. 384/112; 384/113; 384/292; 384/909
[58] Field of Search ............. 384/112, 123, 292, 909, 384/908, 113

[56] References Cited

U.S. PATENT DOCUMENTS

| 3,837,716 | 9/1974 | Allen et al. | 384/112 |
| 4,652,149 | 3/1987 | Nakaoko et al. | 384/100 |
| 4,798,476 | 1/1989 | Sakatani et al. | 384/112 |
| 4,875,263 | 10/1989 | Furumura | 384/909 |
| 4,883,367 | 11/1989 | Maruyama | 384/112 |

*Primary Examiner*—Lenard A. Footland
*Attorney, Agent, or Firm*—Fitzpatrick, Cella, Harper & Scinto

[57] ABSTRACT

A hydrodynamic bearing system comprises a shaft, a sleeve rotatably fitted on the shaft and a thrust plate fixed to the sleeve and acting to support one end of the shaft in a thrust direction. First shallow grooves are formed in at least one of fitted surfaces of the shaft and of the sleeve to support one of the shaft and the sleeve with respect to the other in a radial direction, and a second shallow groove is formed in at least one of the shaft and the thrust plate with respect to the other in a thrust direction. The thrust plate is made of material including resin material as a main component and has an outside periphery portion with a thickness thicker than that of an inside periphery portion thereof.

6 Claims, 7 Drawing Sheets

HYDRODYNAMIC BEARING SYSTEM

This application is a continuation of application Ser. No. 652,320, filed Feb. 8, 1991, which is a continuation of application Ser. No. 502,634, filed Apr. 2, 1990, both abandoned.

BACKGROUND OF THE INVENTION

1. Field of the Invention

The present invention relates to a hydrodynamic bearing system which is suitable to be used as a bearing for a rotary unit of a deflection scanning apparatus used with a recording system such as a laser beam printer.

2. Related Background Art

Recently, rotary apparatuses which must be operated at a high speed and/or with high accuracy have been requested more and more. Particularly, in a laser beam printer, a hydrodynamic bearing of non-contacting type has been used to obtain the rotation with high accuracy. Such a hydrodynamic bearing is described, for example, in the Japanese Patent Application No. 1-35564 filed on Feb. 15, 1989.

Such hydrodynamic bearing system is designed as shown in FIG. 15. That is to say, it comprises a shaft 1 having herring-bone shallow grooves formed in a radial (peripheral) surface thereof, a sleeve 2 rotatably receiving the shaft 1, and a thrust plate 3 fixed to the sleeve 2, for holding the shaft in the thrust direction; shallow spiral grooves 11 being formed in an end face of the shaft 1 and in an opposed surface of the thrust plate 3, and a space defined between the shaft 1, sleeve 2 and thrust plate 3 being filled with lubricating fluid. When the shaft 1 is rotated, the lubricating fluid flows in the direction shown by the arrows. Accordingly, in the radial direction, the pressure is generated by the herringbone shallow grooves 10 to maintain the radial surfaces of the shaft and sleeve in a non contacting condition. Also, in the thrust direction, the pressure is generated by the opposed shallow spiral grooves 11 to support the end of the shaft in a non-contacting fashion. Further, the thrust plate 3 has a central hole 7 and peripheral holes 9, these holes being communicated with each other by grooves or recesses 8. In this way, the lubricating fluid is circulated, thereby preventing the occurrence of negative pressure at the peripheral area of the bearing forming portion and permitting the dispersion of heat.

Further, an annular recess 5 is formed in an inner peripheral surface of the sleeve 2 in the vicinity of an open end thereof, and, at an outside of the recess 5 (i.e., at a position nearer to the open end of the sleeve than the position of the recess), shallow grooves 6 are formed in the radial surface of the shaft 1 into which the fluid can flow in the thrust direction, thereby preventing the scattering of the fluid.

Further, in order to stabilize the floating feature of the shaft, small holes 12 may be provided in the vicinity of the recess 5 (at a position corresponding to one between the shallow grooves 10 and the shallow grooves 6).

Further, FIG. 16 shows a sectional view of a deflection scanning rotary apparatus of a laser beam printer incorporating the hydrodynamic bearing therein. In FIG. 16, a rotary shaft 101 is rotatably received in a sleeve 102, and a thrust plate 103 and a fixing plate 104 are arranged at a lower end of the sleeve 102 and the fixing plate is fixed to an outer housing 105. The rotary shaft 101 has a flange 106 fixedly mounted thereon. A rotary polygonal mirror 107 is fixed to the upper side of the flange 106, and a yoke 109 having driving magnets 108 fixed thereto is fixedly mounted on the lower side of the flange. Further, stators 110 are fixed to the housing 105 in confronting relation to the driving magnets 108.

The thrust plate 103 has a shallow groove 111 on its surface opposed to the end of the rotary shaft 101 to form a thrust hydrodynamic bearing, and also has a central hole 112 and radial recesses 113 for the circulation of the lubricating fluid. In addition, on the outer peripheral surface of the rotary shaft 101, two sets of shallow herring-bone grooves 114 are provided in confronting relation to the inner peripheral surface of the sleeve 102 to form a radial hydrodynamic bearing. Further, in the vicinity of the open end of the sleeve, shallow spiral grooves 115 are formed in the outer peripheral surface of the rotary shaft to flow the lubricating fluid toward the thrust hydrodynamic bearing. Further, an annular recess 116 formed in the inner peripheral surface of the sleeve 102 in confronting relation to a position between the shallow herring-bone grooves 114 and the shallow spiral grooves 115 of the rotary shaft, the recess 116 having small radial holes 117. In this way, the stability of the hydrodynamic bearing portions is ensured.

However, in such system, if the thrust plate is made of metallic material, the machining operation is required, which machining operation meets with the working accuracy of the thrust plate, but is costly. On the other hand, if the thrust plate is made of resin material (such as polyacetal, polycarbonate, PPS and the like), the shrinkage of the resin after it is moulded must be taken in consideration. If not considered, the shape or configuration of the thrust bearing portion is undulatory or uneven, which results in the difficulty in the insurance of the accuracy of the thrust plate itself and/or the assembling of the thrust plate. Further, the contacting points between the rotary shaft and the thrust plate when the shaft is stationary is unstable, with the result that the frictional torque would be increased when the shaft starts to rotate. Furthermore, the eccentric or local where the torque would occur, and the ability for generating the thrust force when the shaft is rotated would be reduced, thus making the bearing efficiency unstable.

Further, if the above-mentioned hydrodynamic bearing is used with the laser beam printer, when the deviation of the inclination of the rotary polygonal mirror is increased, the quality of an image formed by the polygonal mirror will be worsened. In order to reduce such deviation, if the clearance or distance between the spiral grooves formed in the shaft is decreased, the loss of the torque will be increased when the shaft is rotated at a high speed. Further, if the clearance is merely decreased, the flow rate of the fluid or the generated pressure will be increased, thus worsening the stability of the thrust hydrodynamic bearing.

SUMMARY OF THE INVENTION

The present invention aims to eliminate the above-mentioned drawbacks, and, therefore, an object of the present invention is to provide a hydrodynamic bearing system wherein the working accuracy of the thrust plate is ensured even if the thrust plate is made of resin material, and the friction and/or wear that occurs when the rotary shaft is stopped or is started to rotate is reduced.

In order to achieve the above object, the present invention provides a hydrodynamic bearing system comprising a shaft, a sleeve rotatably fitted on the shaft, and a thrust plate fixed to the sleeve and acting to support one end of the shaft in a thrust direction, first shallow grooves being formed in at least one of fitted surfaces of the shaft and of the sleeve which are opposed to each other, the sleeve supporting the shaft with its fitted surface in a radial direction, second shallow groove or grooves being formed in at least one of the shaft and the thrust plate to generate fluid pressure for supporting the shaft between the one end of the shaft and the thrust plate in the thrust direction, and a hole communicating with the thrust plate or with a side of the shaft being formed in a central portion of an end surface of the shaft or a surface of the thrust plate, and wherein the thrust plate has an outside periphery portion having a thickness thicker than that of an inside periphery portion thereof.

Normally, the thrust plate is made of material including resin material as a main component, and the shape of the thrust plate is determined by the moulding operation.

Further, the thrust plate may be formed to have a central convex portion protruding by about a few micrometers.

With the arrangement as mentioned above, when the shaft is rotated, the fluid situated between the end surface of the shaft and the thrust plate is forcibly fed to a central portion of the clearance between the shaft and the thrust plate by the second shallow groove, thereby increasing the pressure in the central portion, thus floating the shaft. Meanwhile, the fluid forcibly fed to the central portion is discharged toward the thrust plate or the side of the shaft through the hole formed in the thrust bearing surface of the thrust plate or in the end surface of the shaft opposing to the thrust bearing surface, and is again forcibly fed to the central portion. In this way, the fluid is circulated.

The inner periphery portion of the thrust plate has a thickness smaller than the outer periphery portion thereof. Accordingly, when the thrust plate is formed from the resin material by the moulding operation, the shape of the thrust bearing surface of the plate becomes considerably stable in such a manner that the central portion thereof protrudes in a convex fashion by a few micrometers, and, therefore, the frictional torque occurred on the end of the shaft when the shaft is started to rotate will be decreased in comparison with the conventional hydrodynamic bearing systems. Accordingly, the wear of the shaft end and/or the thrust plate can be reduced.

That is to say, according to the present invention, by decreasing the thickness of the inner periphery portion of the thrust plate in comparison with the thickness of the outer periphery portion of the thrust plate, the accuracy of the shape of the thrust plate can be ensured even when the thrust plate is made of resin material, thus reducing the cost of the plate.

Another object of the present invention is to provide a hydrodynamic bearing system wherein the accuracy of the assembling of the bearing is improved and which can maintain the high accuracy and provide a good and stable bearing ability.

In order to achieve this object, according to the present invention, on the opposite side of the thrust bearing surface of the thrust plate, a step is formed so that a thickness of an inside peripheral portion is thinner than a thickness of an outside peripheral portion, and the thinner inside peripheral portion is adapted to be abutted against the fixing plate. Thereby, the accuracy of the shape of the thrust plate and the accuracy of the assembling of the plate can be easily obtained, and the thrust plate becomes inexpensive.

A further object of the present invention is to provide a hydrodynamic bearing rotary system which can reduce the deviation of the inclination of the polygonal mirror to obtain a stable image quality and can reduce the loss of the torque and which does not worsen the stability of the hydrodynamic thrust bearing.

In order to achieve this object, according to the present invention, among a plurality of hydrodynamic radial bearing portions of herring-bone type, the clearance between the herring-bone grooves in the hydrodynamic radial bearing portion nearest to the polygonal mirror is selected to be smaller than the clearances of the remaining hydrodynamic radial bearing portions, and the clearance between the spiral grooves arranged in the vicinity of the open end of the sleeve is selected to be larger than the clearance of any hydrodynamic radial bearing portion.

DETAILED DESCRIPTION OF THE PREFERRED EMBODIMENTS

The present invention will now be explained in connection with embodiments thereof with reference to the accompanying drawings.

Figure 1:
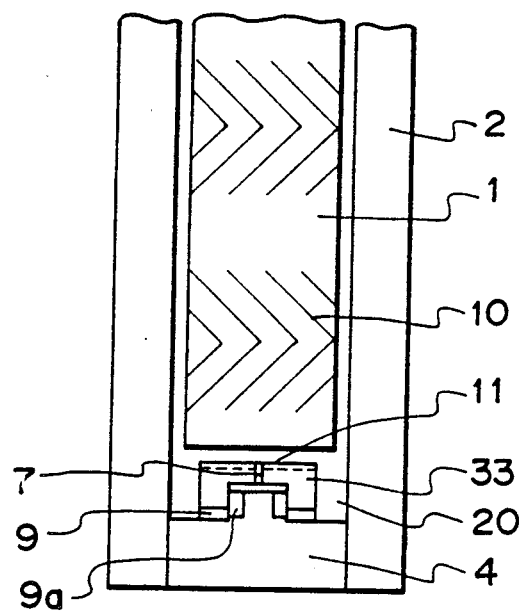
FIG. 1 is a view of a hydrodynamic bearing system according to a preferred embodiment of the present invention.
Figure 15:
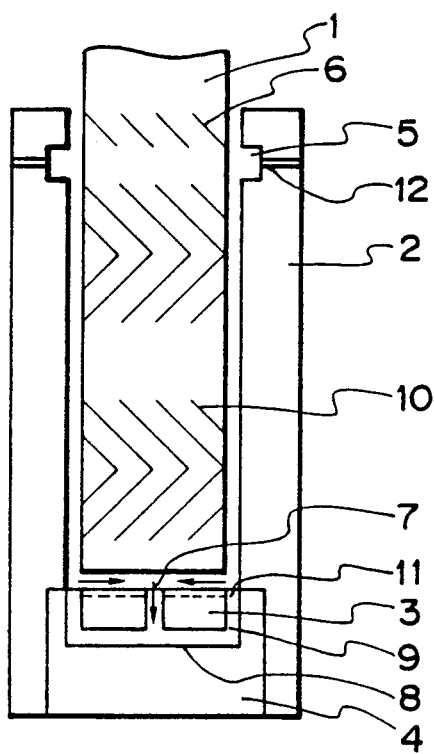
FIGS. 15 and 16 show examples of conventional hydrodynamic bearing systems, respectively.

FIG. 1 is a sectional view of a hydrodynamic bearing system according to an embodiment of the present invention. It should be noted that the same elements as those shown in FIG. 15 are designated by the same reference numerals. In FIG. 1, a rotary shaft 1 is rotatably fitted into a sleeve 2, and a plurality of sets of shallow herring-bone grooves 10 (each having a depth of about 2-20 μm) are formed in an outer peripheral surface of the shaft. Further, a thrust plate 33 made from resin material by the moulding operation is fixed to the sleeve 2 through a fixing plate 4. The thrust plate 33 has a shallow groove 11 for supporting the rotary shaft 1 in a thrust direction, and a central hole 7. Looking in an up-and-down direction, a thickness of an outside periphery portion of the thrust plate is larger than an inside periphery portion of the thrust plate, and a plurality of recesses 9 are formed in the thicker area of the outside periphery portion. A plurality of recesses 9a are also formed in the fixing plate 4, and, when assembled, the hole 7 and recesses 9, 9a communicate with each other.

Accordingly, when the rotary shaft 1 starts to rotate, fluid situated in a clearance or space 20 between the sleeve 2 and the thrust plate 33 is forcibly fed toward a central portion of the thrust plate by the shallow groove 11 to increase the pressure in the central portion, thereby floating the rotary shaft 1. The fluid forcibly fed is discharged from the central hole 7 and is again returned to the space 20 through the recesses 9 and 9a. In this way, the fluid is circulated.

Figure 2A:
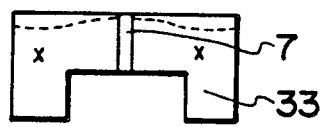
FIG. 2A is an elevational view of a thrust plate of the bearing system of FIG. 1.
Figure 2B:
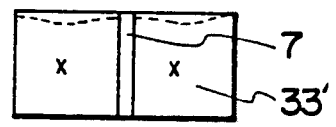
FIG. 2B is an elevational view of a comparable thrust plate.

Next, the shape of the thrust plate 33 will be explained with reference to FIGS. 2A and 2B. FIG. 2A is a sectional view of the thrust plate 33 made from the resin material by the moulding operation. The thrust plate 33 has the outside periphery portion having the thickness larger than that of the inside periphery portion thereof.

The shrinkage of the resin material generally occurs when the material is cooled after it has been moulded, and the amount of the shrinkage is proportional to the thickness of the product, and it is considered that the shrinkage of material occurs toward an area of the product where the cooling occurs at the latest stage in the cooling process. Therefore, in the shape shown in FIG. 2A, since the area shown by the symbol x is cooled last, the shrinkage of the material occurs toward the area x. Further, due to the difference in thickness between the outside periphery portion and the inside periphery portion, the shape of the bearing surface of the thrust plate after shrinking is as shown by the broken line. Incidentally, if a thrust plate having a uniform thickness is made from the resin material by the moulding operation, the shape of the thrust plate will be as shown in FIG. 2B. Therefore, according to the shape shown in FIG. 2A, in comparison with the shape shown in FIG. 2B, the shape of the thrust plate after moulding becomes more stable in such a manner that the central portion is protruded convexly, and it is possible that the accuracy of flatness is reduced below a few micrometers (except for the shallow groove 10). Further, since the rotary shaft 1 contacts the thrust plate 33 in the vicinity of the central hole 7 when the shaft is stationary, the friction torque occurring in the initiation of rotation of the shaft will be smaller, thus reducing the wear.

Figure 3:
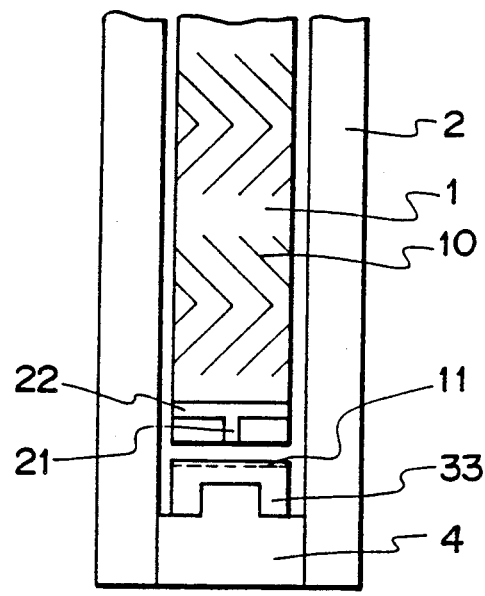
FIG. 3 is a view of a hydrodynamic bearing system according to another embodiment of the present invention.
Figures 4A, 4B:
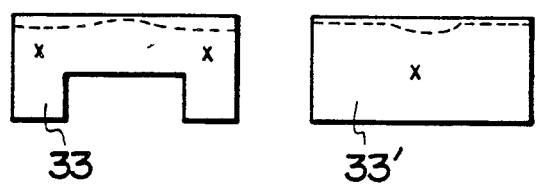
FIG. 4A is an elevational view of a thrust plate of the bearing system of FIG. 3.
FIG. 4B is an elevational view of a comparable thrust plate.

FIG. 3 is a sectional view of a hydrodynamic bearing system according to another embodiment of the present invention. In this bearing system, a central hole 21 is formed in the end surface of the rotary shaft 1, and a plurality of transverse holes 22 are also provided to communicate with the central hole. The fluid can circulate through these holes. The thrust plate 33 has a plate-shape, but the thickness of the plate is so designed that the outside periphery portion has a thickness larger than that of the inside periphery portion with respect to the thrust direction. In this case, when the thrust plate 33 is made from the resin material by the moulding operation, the shape of the thrust bearing surface of the thrust plate after shrinking will be as shown by the broken line in FIG. 4A, so that the central portion of the plate protrudes convexly by a few micrometers. Accordingly, the same advantage as in the case of FIG. 2A can be obtained. Incidentally, in the case of a thrust plate having a uniform thickness, the shape will be as shown in FIG. 4B.

Figure 5:
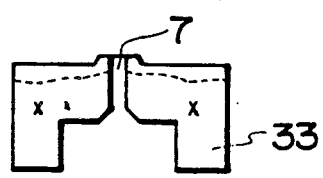
FIG. 5 is an elevational view of a thrust plate according to a further embodiment of the invention.

FIG. 5 is a sectional view of a thrust plate according to a further embodiment of the invention. A thrust plate 33 of this embodiment has a ring-shaped projection formed around the central hole 7 and protruded from the bearing surface by a few micrometers. Further, the thickness of the thrust plate 33 is so selected that the thickness of the outside periphery portion is larger than that of the inside periphery portion, similar to the previous embodiments. Therefore, the shape of the plate after the moulded material has been shrunk will be as shown by the broken line, whereby the central portion protrudes more convexly to achieve a further advantage. Further, if the projection is adopted to the thrust plate of FIG. 3, the same advantage can be obtained. Incidentally, if the central protrusion is not expected, the plate can be used.

Further, in the above embodiments, while the step or shoulder is adopted in order to decrease the thickness of the inner periphery portion of the thrust plate less than the thickness of the outside periphery portion thereof, taper and the like may be used to thicken the outside periphery portion more than the inside periphery portion.

Figure 6:
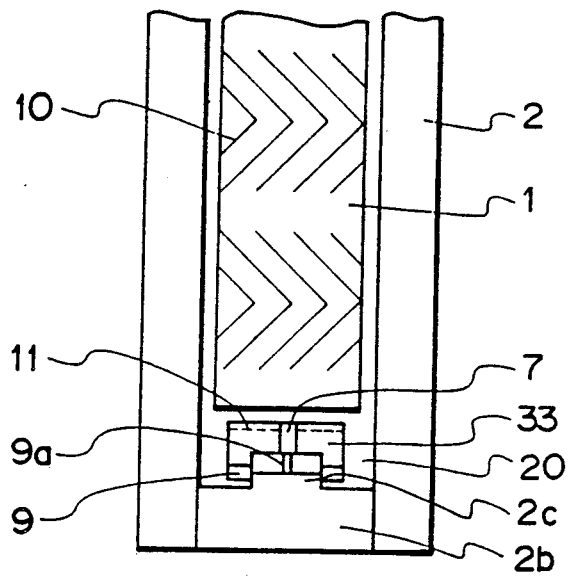
FIG. 6 is a view of a hydrodynamic bearing system according to a further embodiment of the present invention.

FIG. 6 is a sectional view of a hydrodynamic bearing system according to a further embodiment of the present invention. The same elements as those in FIG. 15 are designated by the same reference numerals The rotary shaft 1 is rotatably fitted into the sleeve 2 and has a plurality of shallow herring-bone grooves 10 (each having a depth of about 2-20 μm) on its outer peripheral surface. Further, a thrust plate 33 made from resin material (for example, polyacetal, polycarbonate, PPS and the like) by the moulding operation is fixed to the sleeve 2 through a fixing plate 2b. The thrust plate 33 has a shallow groove 11 (having a depth of about 2-20 μm) for supporting the rotary shaft in the thrust direction, and a central hole 7. At a side opposite to the shallow groove 11 (i.e., lower side in FIG. 6), a step is formed in such a manner that the outside periphery portion of the thrust plate has a thickness larger than a thickness of the inside periphery portion with respect to the thrust direction, and a plurality of recesses 9 are formed in the thicker area of the outside periphery portion. On the other hand, the fixing plate has a projection 2c onto which the thrust plate 33 is attached. A plurality of recesses 9a are formed in the projection 2c of the fixing plate 2b, and, when assembled, the holes 7 and the recesses 9, 9a are communication with each other.

Next, the operation of the hydrodynamic bearing system having the above-mentioned construction will be explained. When the rotary shaft 1 starts to rotate, the fluid situated in a space 20 between the sleeve 2 and the thrust plate 33 is forcibly fed toward a central portion of the thrust plate by the shallow groove 11 to increase the pressure in the central portion, thereby floating the rotary shaft 1. The forcibly fed fluid is discharged from the central hole 7 and is returned to the space 20 through the recesses 9 and 9a. In this way, the fluid is circulated.

The thrust plate 33 is attached to the fixing plate 2b by press-fitting the projection 2c of the fixing plate 2b into the step defined between the thicker outside periphery portion and the thinner inside periphery portion of the thrust plate 33 until the projection 2c of the fixing plate 2b abuts against the inside periphery portion of the thrust plate 33. In this way, the thrust plate and the fixing plate are integrally combined by press-fitting the projection 2c of the fixing plate 2b into the step (cavity) formed in the lower surface of the thrust plate 33.

Figure 7A:
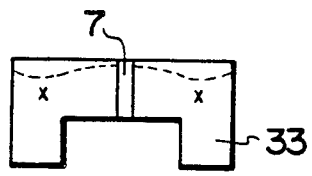
FIG. 7A is an elevational view of a thrust plate of the bearing system of FIG. 6.
Figure 7B:
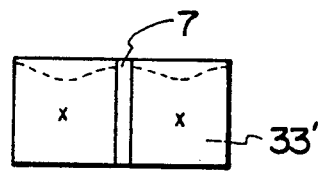
FIG. 7B is an elevational view of a comparable thrust plate.

Next, the accuracy of the shape of the thrust plate 33 will be explained with reference to FIGS. 7A and 7B. FIG. 7A shows the thrust plate 33 according to the present invention made from resin material by the moulding operation. At a side opposite to the shallow groove 11 (in an upper surface), the thrust plate has the step by which the inside periphery portion becomes thinner than the outside periphery portion. In this way, there is provided the cavity in the lower surface of the thrust plate, into which the projection 2c for holding the thrust plate is fitted.

The shrinkage of the resin material generally occurs when the material is cooled after it has been moulded, and the amount of the shrinkage is proportional to the thickness of the product, and it is considered that the shrinkage of material occurs toward an area of the product where the cooling occurs at the latest stage in the cooling process.

Therefore, in the shape according to the present invention (FIG. 7A), since the area shown by the symbol x is cooled last, the shrinkage of the material occurs toward the area x. Due to the difference in thickness between the outside periphery portion and the inside periphery portion, the shape of the bearing surface of the thrust plate after shrinking is as shown by the broken line. Incidentally, if a thrust plate having a uniform thickness is made from the resin material by the moulding operation, the shape of the thrust plate will be as shown in FIG. 7B.

Here, in consideration of the accuracy of the shape in the bearing surface, the shape of the thrust plate after moulding becomes more stable in such a manner that the central portion is protruded convexly, and it is possible that the accuracy of flatness is reduced below a few micrometers (except for the shallow groove 11). Further, since the rotary shaft 1 contacts the thrust plate 33 in the vicinity of the central hole 7 when the shaft is stationary, the friction torque occurring in the initiation of rotation of the shaft will be smaller, thus reducing the wear.

On the other hand, since the inside periphery portion is less deformed due to the less thickness thereof than the thickness of the outside periphery portion, the inside periphery portion is suitable as a reference surface for attaching the fixing plate to the thrust plate. Accordingly, by designing so that the thrust plate 33 is attached to the fixing plate 2b by press-fitting the projection 2c of the fixing plate 2b into the cavity defined between the thicker outside periphery portion and the thinner inside periphery portion of the thrust plate 33 until the projection 2c of the fixing plate 2b abuts against the inside periphery portion of the thrust plate 33, the accuracy of the thrust bearing surface of the thrust plate 33 after assembly (for example, perpendicularity to the radial bearing surface) can easily be obtained.

Figure 8:
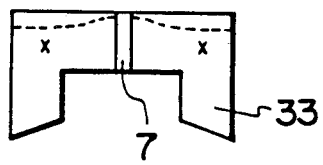
FIG. 8 is an elevational view of a thrust plate according to a still further embodiment of the invention.

FIG. 8 shows a thrust plate according to a further embodiment of the present invention. The outside peripheral portion of the thrust plate 33 having a thickness larger than that of the inside periphery portion is tapered so that the thickness of the outside periphery portion is increased toward the outside periphery thereof. With this arrangement, when the fixing plate is attached to the thrust plate by the press-fit, the projection 2c of the fixing plate 2b can easily be introduced into the cavity of the thrust plate to be abutted against the inside periphery portion, thus improving the accuracy of the shape of the bearing surface without worsening the accuracy after the assembling.

Figure 9:
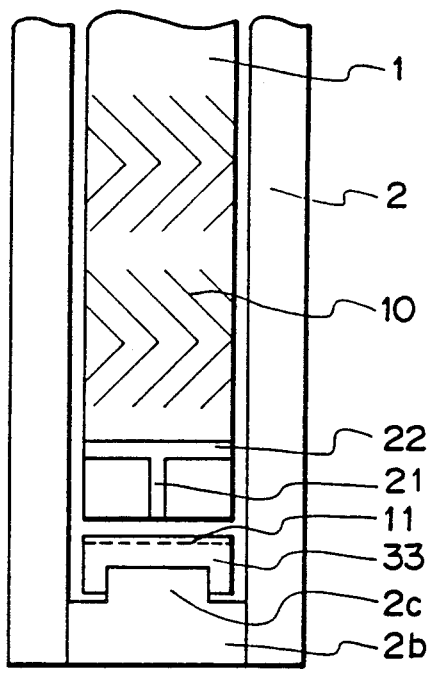
FIG. 9 is a view of a hydrodynamic bearing system according to a still further embodiment of the present invention.

FIG. 9 shows a still further embodiment of the present invention. The rotary shaft 1 has a central hole 21 formed in the end surface thereof and a plurality of radial holes 22 communicating with the central hole. The fluid can circulate through these holes. The thrust plate 33 has a plate-shape, but the thickness of the plate is so designed that the outside periphery portion has a thickness larger than that of the inside periphery portion by means of a step or cavity. The projection 2c of the fixing plate 2b is press-fitted into the cavity until the projection 2c of the fixing plate 2b abuts against the inside periphery portion of the thrust plate 33.

Figures 10A, 10B:
FIG. 10A is an elevational view of a thrust plate of the bearing system of FIG. 9.
FIG. 10B is an elevational view of a comparable thrust plate.

In this case, when the thrust plate 33 is made from the resin material by the moulding operation, the shape of the thrust plate 33 after shrinking is shown by the broken line in FIG. 10A, so that the central portion of the plate protrudes convexly by a few micrometers, and the deformation of the inner surface of the inside periphery portion will be small. Accordingly, the same advantage as in the previous embodiment can be obtained. Incidentally, in the case of a thrust plate having a uniform thickness, the shape will be as shown in FIG. 10B.

Incidentally, taper and the like may be used to thicken the outside periphery portion more than the inside periphery portion. In this way, by making the the thrust plate 33 from the resin material by the moulding operation, by providing a step by which the thickness of the inside periphery portion is reduced more than the thickness of the outside periphery portion, and by abutting the projection 2c of the fixing plate 2b against the thinner inside periphery portion, the accuracy of the bearing surface of the thrust plate 33 and the assembling accuracy can easily be obtained, and the thrust plate is inexpensive.

Figure 11:
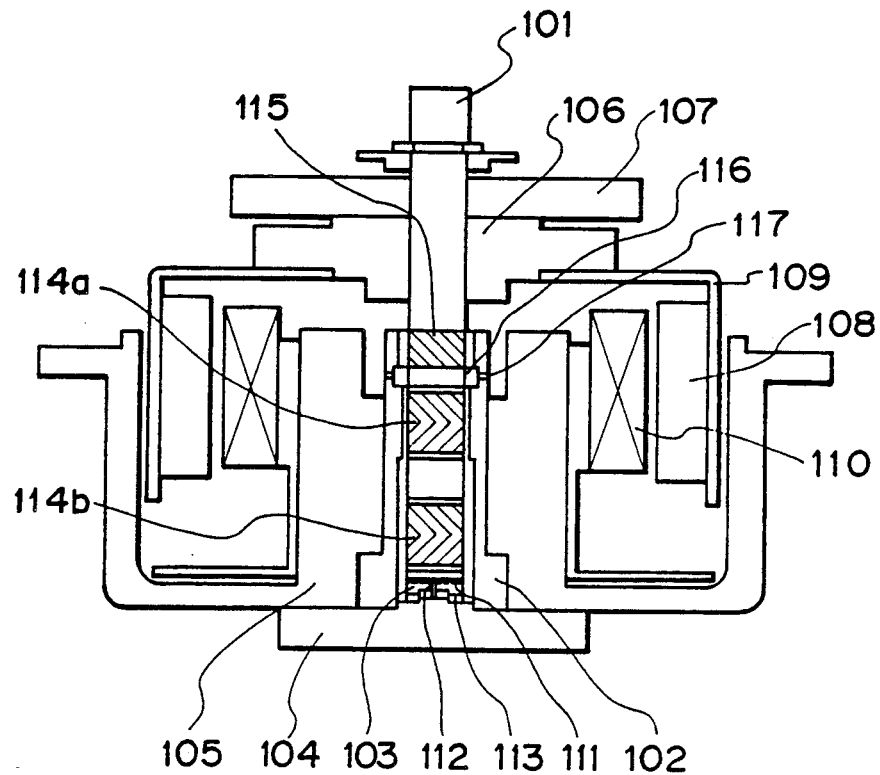
FIG. 11 is a view of a hydrodynamic bearing system according to a further embodiment of the present invention.
Figure 16:
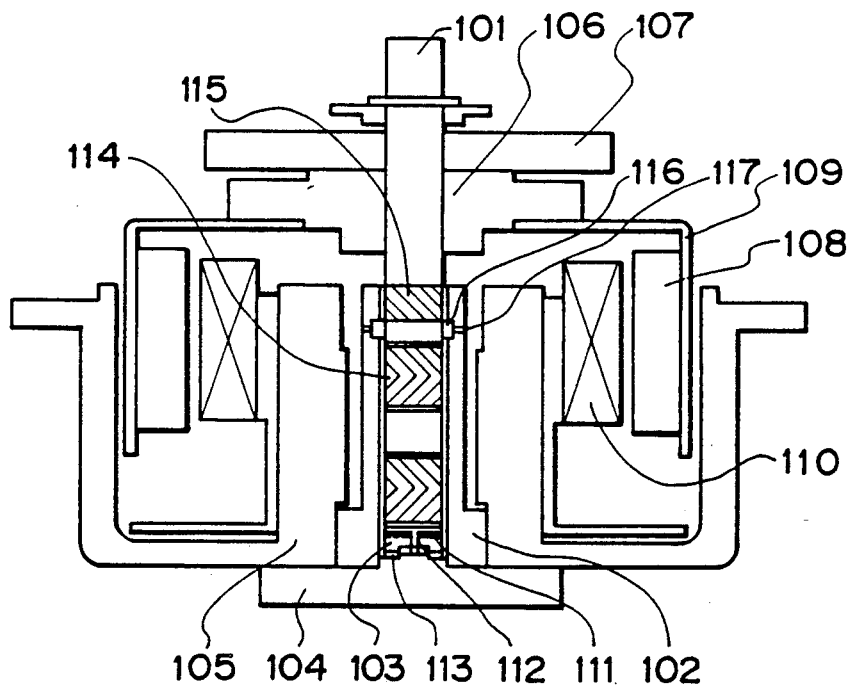

FIG. 11 is a sectional view of a hydrodynamic bearing system according to a still further embodiment of the present invention. The same elements as those shown in FIG. 16 and having the same function are designated by the same reference numerals and the explanation thereof will be omitted.

In FIG. 11, a rotary shaft 101 is rotatably fitted into a sleeve 102. The rotary shaft 101 is provided at its upper portion with a flange 106 fixedly mounted thereon, and a rotary polygonal mirror 107 is fixed to the upper side of the flange 106. Further, on an outer peripheral surface of the rotary shaft 101 facing an inner peripheral surface of the sleeve 102, two sets of shallow herring-bone grooves 114a, 114b having the same configuration are formed to form the hydrodynamic radial bearing. Further, in the vicinity of the open end of the sleeve, shallow spiral grooves 115 are formed in the outer peripheral surface of the rotary shaft to flow the lubricating fluid toward the thrust hydrodynamic bearing, so that the scattering of the lubricating fluid can be prevented during the high speed rotation of the rotary shaft.

The distance between the shaft portion in which the shallow herring-bone grooves 114a nearer to the rotary polygonal mirror 107 are formed and the sleeve 102 is selected to be smaller than the distance between the shaft portion in which the other shallow herring-bone grooves 114b are formed and the sleeve 102. On the other hand, the distance between the shaft portion in which the shallow spiral grooves 115 are formed and the sleeve 102 is selected to be larger than the distances between the shallow herring-bone grooves 114a, 114b and the sleeve.

For example, it is assumed that the distance between the herring-bone grooves 114a and the sleeve is 5 μm, the distance between the other grooves 114b and the sleeve is 10 μm and the distance between the spiral grooves 115 and the sleeve is 20 μm. Since the rigidity of the hydrodynamic radial bearing is in inverse proportion to a square of the distance, if the rigidity of the bearing in case of 10 μm distance is A (kg/μm), it is guessed that the rigidity of the bearing in case of 5 μm distance will be about 4 A (kg/μm).

Figure 12:
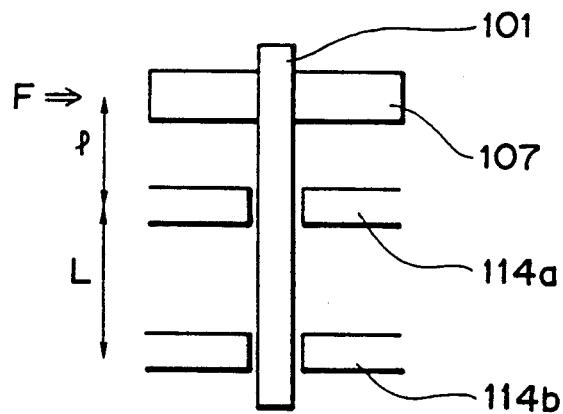
FIG. 12 shows a model for roughly calculating the amount of deviation of a rotary polygonal mirror.

Now, a model of a bearing rotary system as shown in FIG. 12 will be explained. In FIG. 12, it is assumed that all of the constructional elements are rigid bodies, and the rigidity of the radial bearing 114a is A and the rigidity of the radial bearing 114b is B. Further, it is assumed that a distance between the bearings is L, a distance between the upper radial bearing 114a and the rotary polygonal mirror is l, there is no moment rigidity of the thrust bearing, and the rotary polygonal mirror is subjected to an external force F. In this case, the displacement Δ x of the rotary polygonal mirror will be expressed by the following equation:

$$\Delta x = \frac{F(L + l)^2}{AL^2} + \frac{Fl^2}{BL^2}$$

Here, for simplicity's sake of the explanation, it is assumed that l=L, the above equation will be as follows:

$$\Delta x = 4 F/A + F/B$$

Now, when the distances between the shallow herring-bone grooves 114a, 114b and the sleeve are conditioned to the following (a)-(c), rough calculated values of the displacements of the rotary polygonal mirror will be as shown in the Table 1.

(a) according to the present invention, when the distance between the shallow grooves 114a and the sleeve is a half of the distance between the shallow grooves 114b and the sleeve;

(b) when the distance between the shallow grooves 114a and the sleeve is equal to the distance between the shallow grooves 114b and the sleeve;

(c) Inversely to the present invention, when the distance between the shallow grooves 114b and the sleeve is a half of the distance between the shallow grooves 114a and the sleeve;

TABLE 1

|  | (a) | (b) | (c) |
|---|---|---|---|
| Distance regarding Grooves 114a | 2/a | a | a |
| Rigidity regarding Grooves 114a | 4 A | A | A |
| Distance regarding Grooves 114b | a | a | a/2 |
| Rigidity regarding Grooves 114b | A | A | 4 A |
| External Force of Mirror | F | F | F |
| Displacement of Mirror | 2 F/A | 5 F/A | 4.25 F/A |

From the above Table 1, it will be found that, according to the present invention, when the rotary shaft 101 and the rotary polygonal mirror 107 are rotated or spinned while being deflected in the inclination direction due to the unbalance of the rotary polygonal mirror, external vibration and the like, the deviation of the rotary polygonal mirror can be effectively reduced.

Further, since the distance between the shallow spiral grooves 115 (in the vicinity of the open end of the sleeve) and the sleeve is larger, the loss of the torque occurring during the rotation of the shaft can be reduced. Since the loss of the torque is in inverse proportion to the distance, if the distance becomes twice, the loss of the torque in this area will be reduced to ½. Accordingly, the loss of torque increased in the area regarding the distance between the grooves 114a and the sleeve can be effectively reduced. Incidentally, since the shallow spiral grooves 115 has a purpose for preventing the scattering of the fluid, by applying a certain dynamic pressure, the grooves 115 can perform the purpose. Thus, the distance between the spiral grooves and the sleeve can be lengthened in relatively large extent (for example, 10-200 μm), and, by lengthening such distance, the hydrodynamic bearing can be used even with the high speed rotation of the shaft without worsening the stability of the hydrodynamic thrust bearing.

Accordingly, by shortening the distance between the shallow grooves 114a and the sleeve, the displacement of the rotary polygonal mirror with respect to the external force can be decreased, and, by lengthening the distance between the spiral grooves 115 and the sleeve, the increased loss of torque can be reduced. Further, even during the high speed rotation of the shaft, the deviation of the rotary polygonal mirror can be decreased, which results in the reduction of the loss of torque and provides a stable and good image quality in the laser beam printer.

Figure 13:
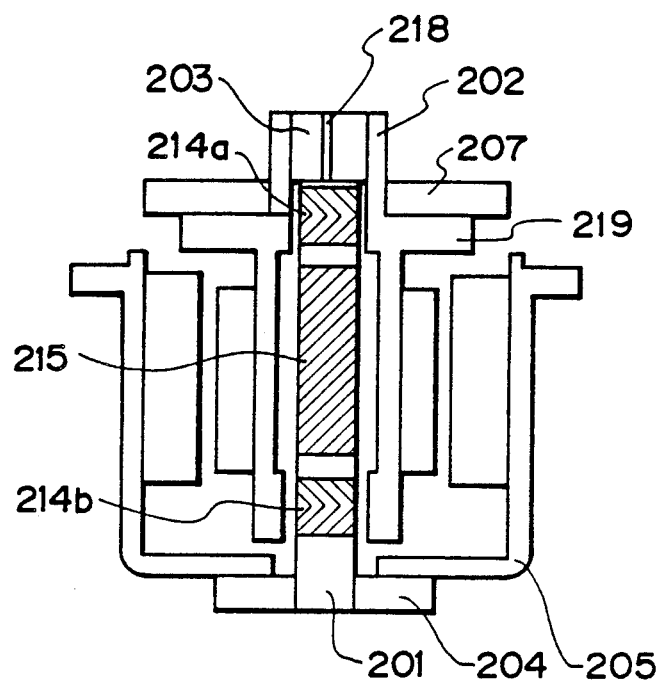
FIG. 13 is a view of a hydrodynamic bearing system according to a further embodiment of the present invention.

FIG. 13 is a sectional view showing a further embodiment of the present invention. In FIG. 13, a fixed shaft 201 is fixed to a center of a fixing plate 204, which in turn is fixed to an outer housing 205. A rotary sleeve 202 is rotatably fitted onto the fixed shaft 201. On an outer surface of the fixed shaft 201 opposing the inner surface of the sleeve 202, shallow herring-bone grooves 214a, 214b are formed to form the hydrodynamic radial bearing. Further, between the herring-bone grooves 214a and 214b, shallow spiral grooves 215 are formed in the outer surface of the fixed shaft, and a thrust plate 203 having a central restriction hole 218 is fixed in the rotary sleeve 202 at its upper end. The lubricating fluid forcibly fed by the spiral grooves 215 generates a thrust pressure in an area between the end surface of the fixed shaft 201 and the thrust plate 203, thus keeping the fixed shaft 201 and the thrust plate 203 in a non-contacting condition.

On an upper flange of the rotary sleeve 202, a rotary polygonal mirror 207 is fixedly mounted. Accordingly, since the herring-bone grooves 214a is positioned nearer to the rotary polygonal mirror 207 than the herring-bone grooves 214b, the distance between the shallow grooves 214a and the sleeve is shortened and the distance between the spiral grooves 215 and the sleeve is lengthened, so that the deviation of the rotary polygonal mirror can be reduced and the increase of loss of the torque can be prevented. Further, the shallow spiral grooves 215 forcibly feeds the lubricating fluid in a space between the facing surfaces of the fixed shaft 201 and the thrust plate 203 to generate the thrust pressure for thrust support. Therefore, the distance between the shallow spiral grooves 215 and the sleeve is preferably about 10–100 μm (in case of air lubrication, about 5–50 μm). However, if the width of the area where the spiral grooves 215 are disposed is lengthened, the distance can be further lengthened.

Figure 14:
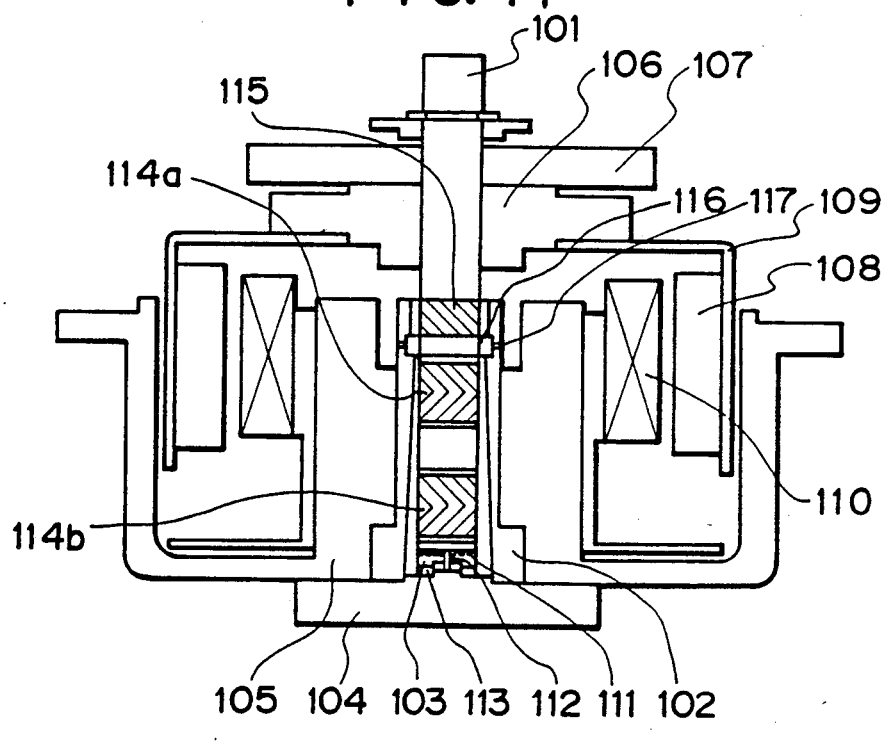
FIG. 14 is a view of a hydrodynamic bearing system according to a still further embodiment of the present invention.

FIG. 14 is a sectional view showing the other embodiment of the present invention. In the bearing system shown in FIG. 14, shallow herring-bone grooves 114a, 114b are formed on an outer surface of a rotary shaft 101 facing an inner surface of a sleeve 102, and the inner surface of the sleeve is tapered to decrease the diameter thereof from the grooves 114b toward the grooves 114a. With this arrangement, since there is no step between the radial bearings, the generation of spiral due to the rotation of the shaft can be prevented, thus eliminating the occurrence of the bubbles. Further, the working of the inner surface of the sleeve can also be simplified, leading to the lower costs.

Incidentally, since the inner surface of the sleeve facing the shallow herring-bone grooves is tapered as mentioned above, the fluid can easily flow from top to bottom. Accordingly, although the pressure generated in the hydrodynamic thrust bearing is slightly increased, the floating amount of the thrust plate is merely increased slightly, but the bearing ability is not worsened. And, the radial bearings are not badly influenced upon the tapered sleeve.

Further, an inner surface of the sleeve facing the shallow spiral grooves 115 may be cylindrical or tapered in shape.

What is claimed is:

1. A hydrodynamic bearing system comprising:
  a shaft;
  a sleeve, with one of said shaft and said sleeve being rotatably supported to the other;
  a thrust plate fixed to said sleeve and acting to support one end of said shaft in a thrust direction;
  first shallow grooves formed in at least one of fitted surfaces of said shaft and of said sleeve, to support one of said shaft and said sleeve with respect to the other in a radial direction;
  a second shallow groove formed in at least one of said shaft and said thrust plate, to support one of said shaft and said thrust plate with respect to the other in a thrust direction; and wherein,
  said thrust plate is made of material including resin material as a main component and has an outside periphery portion having a thickness thicker than that of an inside periphery portion thereof.

2. A hydrodynamic bearing system according to claim 1, wherein a central portion of said thrust plate protrudes convexly by a few micrometers.

3. A hydrodynamic bearing system according to claim 2, wherein a hole communicating with said thrust plate or with a side of said shaft is formed in a central portion of said thrust plate or an end surface of said shaft.

4. A hydrodynamic bearing system comprising:
  a shaft;
  a sleeve, with one of said shaft and said sleeve being rotatably supported to the other;
  a fixing plate fixed to an end of said sleeve;
  a thrust plate fixed to said sleeve and acting to support one end of said shaft in a thrust direction;
  first shallow grooves formed in at least one of fitted surfaces of said shaft and of said sleeve, to support one of said shaft and said sleeve with respect to the other in a radial direction;
  a second shallow groove formed in at least one of said shaft and said thrust plate, to support one of said shaft and said thrust plate with respect to the other in a thrust direction; and wherein,
  said thrust plate is made of material including resin material as a main component and has an outside periphery portion having a thickness thicker than that of an inside periphery portion thereof, and
  said fixing plate has a projection, whereby said fixing plate and said thrust plate are fixedly combined by press-fitting said projection into a cavity defined by said thicker outside periphery portion and said projection is abutted against an inner surface of said thinner inside periphery portion.

5. A hydrodynamic bearing system according to claim 4, wherein a hole communicating with said thrust plate or with a side of said shaft is formed in a central portion of said thrust plate or an end surface of said shaft.

6. A hydrodynamic bearing system according to claim 4, wherein a thickness of said thicker outside periphery portion is gradually increased toward an outside periphery thereof.

* * * * *

UNITED STATES PATENT AND TRADEMARK OFFICE
CERTIFICATE OF CORRECTION

PATENT NO. : 5,096,309

DATED : March 17, 1992

INVENTOR(S) : Mikio Nakasugi, et al.

It is certified that error appears in the above-identified patent and that said Letters Patent is hereby corrected as shown below:

ON THE TITLE PAGE

Item [56], References Cited

Insert:
        --FOREIGN PATENT DOCUMENTS
           371650  10/1963  Switzerland
          2104980  3/1983   United Kingdom--.

Signed and Sealed this

Twentieth Day of July, 1993

Attest:

MICHAEL K. KIRK

Attesting Officer      Acting Commissioner of Patents and Trademarks